United States Patent Office 3,732,121
Patented May 8, 1973

3,732,121
GLOSS FORMING PROCESS
Ronald W. Long, Florissant, Mo., assignor to Ralston Purina Company, St. Louis, Mo.
No Drawing. Continuation-in-part of abandoned applications Ser. No. 822,018 and Ser. No. 822,026, both May 5, 1969. This application Feb. 13, 1970, Ser. No. 11,339
Int. Cl. B44d 1/44; C09d 3/02; D21h 1/34
U.S. Cl. 117—65.2
10 Claims

ABSTRACT OF THE DISCLOSURE

A process for increasing the gloss of paper coating compositions containing protein binders is disclosed. The process involves adding a high gloss inducing material to a bound coating composition, coating a paperboard stock with the coating composition, and calendering the coated paperboard to a gloss which is substantially higher than coated paperboard which is not treated with the high gloss inducing material. Additionally, a gloss inducing solution may be sprayed on the coating before calendering or the gloss inducing solution may be used separately.

---

This application is a continuation-in-part of U.S. patent applications Ser. Nos. 822,018 and 822,026, filed May 5, 1969, now abandoned.

Gloss is a desirable characteristic of paper coatings. The resistance of coated paperboard to abrasion, marking and smudging is often associated with the gloss properties of the coated paperboard. The printing characteristics are also a function of the gloss. The resistance of a coating material to picking (removal of particles of coating by the printing rolls) and the ability of the coating to hold out ink on printing may be increased as the gloss of the coating material is increased.

Protein adhesives such as oilseed protein, casein and animal protein have generally been regarded as gloss killing or gloss depressing compounds for paper coating compositions, particularly when compared with coating compositions using styrene-butadiene rubber (SBR) adhesives. Coatings using protein adhesives generally have a dull or matte finish which is not satisfactory for many uses of paperboard.

One method of overcoming the poor gloss properties of protein bound coatings is to impregnate the coated paper with a wax or resin material which provides a glossy surface. A variety of waxes and resins have been used as gloss formers of this type. United States Patent 2,520,900 discloses wax materials and methods of using them to improve gloss. Higher gloss can also be achieved by using synthetic binders such as styrene-butadiene rubber polymers (SBR) as all or part of the adhesive material in the paper coating composition. It is also known to improve the gloss of protein bound coatings by coating an alcohol-water solution on coated paperboard by using calender boxes and then calendering the coated board. United States Patents 2,725,307 and 2,611,717 disclose methods of this type.

All of the above methods of achieving gloss have their limitations; however, styrene-butadiene rubber (SBR) adhesive has poor water holding characteristics which limit its use in coatings. The use of coating waxes and resins also increase the cost of the material and the process. Calender boxes are difficult to use and control; they tend to foul with use and the quality of the coated paperboard is not uniform.

This invention provides a readily controlled method of increasing the gloss and ink hold out properties of paperboard coatings containing protein binders. The process can be practiced in a conventional coating operation, does not entail a large capital expenditure, and is economical to operate. The process can be readily controlled to produce coated paperboard of uniform quality and high gloss. In fact, it is possible to produce paperboard with a protein binder which has higher gloss and superior ink hold out properties than a paperboard coated with a composition having an all styrene-butadiene rubber (SBR) binder by using the process of this invention. The process of this invention can be used singly or in combination with other gloss forming methods to produce coated paperboard of improved gloss.

One aspect of the process of this invention involves adding a high gloss inducing material to a protein bound coating composition, coating a paperboard stock with the coating composition and calendering the coated paperboard to a gloss which is substantially higher than coated paperboard which is not treated with the gloss inducing material. It is not known exactly how the gloss inducing material operates to achieve a high gloss. However, it is believed that the material solubilizes or melts the coating composition to a limited extent and plasticizes the normally brittle protein bound coating to a soft, flexible consistency. The soft, flexible coating can then be smoothed to a higher gloss by the calendering rolls. The highly glossed coating exhibits a substantially improved ink hold out.

Several compounds can be used to form the gloss inducing material, either singly or in combination. The compounds which are most suitable for forming the gloss inducing material are quaternary amines, quaternary amine salts, ethoxylated amines and amine substituted alcohols. In particular, tetramethyl ammonium hydroxide (TMAH), tetramethyl ammonium chloride (TMACI), triethanol amine (TEA), and an ethoxylated amine obtained from the Armour Industrial Chemical Company under the trade name of Ethoduomeen T/20 (Ed T/20) have proven to be particularly effective. Ed T/20 is described as an N-alkyl-N-polyethoxy-N',N'-dipolyethoxy-1,3-propylene diamine having the general structural formula

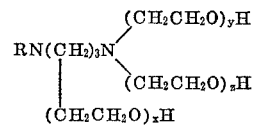

where X+Y+Z=10 and R ranges from $C_{12}$ to $C_{18}$ saturated and from $C_{14}$ to $C_{18}$ unsaturated.

The gloss inducing material can be added to the coating in very small quantities and still achieve the desired smoothing and gloss producing effect. From about 1½ to 20% by weight (dry protein basis) gloss inducing material in the coating composition is sufficient to produce a substantial increase in the gloss of the coated, calendered board.

After the gloss inducing material is added to the coating composition the composition is coated on the base paperboard in a conventional manner. The coated paperboard is then calendered by a conventional process. The nip pressure, nip temperature, and number of nips may be varied as a particular process may require. Generally, a nip temperature of 150 to 300° F. and a roll to roll pressure of 150 p.l.i. (pounds per lineal inch) have proven satisfactory, though temperatures as low as 100° F. may be used. The gloss increases with the number of nips used, but generally the gloss value returns diminish after two nips.

Another aspect of the process of this invention involves applying a high gloss inducing solution on a coated paperboard containing a proteinaceous binder, drying the coated paperboard to the proper consistency, and calendering the treated board to a high gloss. It is not known exacty how the gloss inducing solution operates to achieve a high gloss. However, it is believed that the solution solubilizes the coating composition to a limited extent and plasticizes the normally brittle protein bound coating to a soft, flexible consistency. The soft, flexible coating can then be smoothed to a higher gloss by the calendering rolls. The highly glossed coating exhibits a substantially improved ink hold out.

A variety of materials can be used to form the gloss inducing solution, either singly or in combination with other solvents, including water. To work effectively, the material should have a low boiling point, preferably below the boiling point of water, and should be miscible if used to form a solvent system with other solvents. However, if the solvent system is too volatile, it may evaporate before the desired plasticizing action is achieved. Many common organic solvents such as alcohols, ketones, aldehydes, acids, polyhydroxy alcohols, esters, ethers and including many substituted solvents, i.e., amines, can be used in the process of this invention. Table I discloses a variety of volatile and miscible solvents which can be used to formulate gloss inducing solutions to achieve the desired plasticizing effect.

TABLE I

| Solvent | Type of compound |
| --- | --- |
| Acteone | Ketone. |
| Methylethyl ketone | Do. |
| Methanol | Alcohol. |
| Ethanol | Do. |
| Propanol | Do. |
| Butanol | Do. |
| Acetaldehyde | Aldehyde. |
| Dimethyl ether | Ether. |
| Methyl formate | Ester. |
| Methyl acetate | Do. |
| Dimethyl acetal | Acetal. |
| Ethylene glycol | Polyhydroxy alcohol. |
| Glycerol | Do. |
| Propylene glycol | Do. |
| Diethylene glycol | Do. |
| Triethylene glycol | Do. |
| Dipropylene glycol | Do. |
| Tripropylene glycol | Do. |
| Ethylene glycol monomethyl ether | Substituted ether of polyhydroxy alcohol. |
| Propylene glycol monomethyl ether | Do. |
| Diethylene glycol monomethyl ether | Do. |
| Triethylene glycol monomethyl ether | Do. |
| Dipropylene glycol monomethyl ether | Do. |
| Tripropylene glycol monomethyl ether | Do. |

In particular, solvent systems using combinations of methanol, acetone, ethanol, diethylene glycol and water have proven to be quite satisfactory. It is also advantageous to use wetting agents in the solution if the coated paperboard has a rough surface. The wetting agent helps the solution to uniformly wet the coating surface and achieve a uniform gloss. An alkyl ethoxylated phenol (AEP) obtained under the trade name of Triton–X100 from the Rohm and Haas Company has proven to be a satisfactory wetting agent. The alkyl ethoxylated phenol is a mixture of compounds having the structural formula

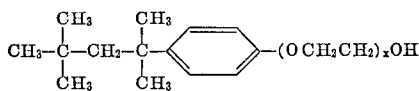

where X is 9 and 10. Table II discloses a number of formulations of gloss inducing solutions which may be used in practicing this invention.

TABLE II
Solvent System Formulations
(Parts By Volume)

| Solvents | | | | Wetting agents | |
| --- | --- | --- | --- | --- | --- |
| H₂O | Acetone | Methanol | Diethylene glycol | Triethanol amine | Alkyl ethoxylated phenol (AEP) |
| | | 100 | | | 0.5 |
| 50 | | 50 | | | 0.5 |
| | | 90 | 10 | | 0.5 |
| | | 80 | 20 | | 0.5 |
| 10 | | 80 | 10 | | 0.5 |
| 20 | | 70 | 10 | | 0.5 |
| 10 | | 72 | 18 | | 0.5 |
| 20 | | 64 | 16 | | 0.5 |
| 50 | 50 | | | | 0.5 |
| | 90 | | 10 | | 0.5 |
| | 80 | | 20 | | 0.5 |
| | 90 | | | 10 | 0.5 |
| 10 | | 81 | 9 | | 0.5 |
| | | 90 | | 10 | 0.5 |
| 20 | | 64 | | 16 | 0.5 |

The gloss inducing solution can be sprayed on the coated board in very small quantities and still achieve the desired smoothing and gloss producing effect. Six pounds or less of solution per 1000 square feet of coated paper is sufficient to produce a substantial increase in the gloss of the calendered board. In some applications as little as two pounds of solution per 1000 square feet will produce a substantial increase in gloss. This quantity of solution readily dries in ambient air in a short time, though forced air or heat may be used to decrease the drying time if the rate of calendering, location of the spray heads and other factors are such that the desired degree of plasticity is not apparent at the calendering rolls with an ambient air dry. The solution may be applied to the hot paperboard at surface temperatures up to about 180° F. This is a particularly advantageous feature, since the solution may be applied directly to the paperboard as the board leaves the drying rolls. The treated board can then be calendered after a very short air dry.

After the gloss inducing solution is sprayed on the coated paperboard and allowed to dry sufficiently to provide the desired plasticity of the coating, the treated board is calendered by a conventional process. The nip pressure, nip temperature, and number of nips may be varied as a particular process may require. Generally, a nip temperature of 150° F. to 300° F. and a roll to roll pressure of 150 p.l.i. (pounds per linear inch) have proven satisfactory, though temperatures as low as 100° F. may be used. The gloss increases with the number of nips used, but generally the gloss value returns diminish after two nips. The calendered board may be dried further if it is still damp after calendering.

A further aspect of this invention contemplates the use of both a gloss inducing material which is added to a protein bound coating composition and a gloss inducing solution which is applied to a coated paperboard containing a proteinaceous binder. I have found that the results of using the combination are extremely useful, that the gloss which results from the combination may be higher than the gloss produced by either process when used alone. In addition, the processes disclosed herein provide superior and greatly improved ink holdout and printing characteristics in the glossed, coated paper. To provide the superior effects of both processes, the gloss inducing solution is applied as described above to a paperboard which has been coated with a protein bound coating composition containing a gloss inducing material. The coated paperboard is then calendered as described above.

Although the processes will be understood by those in the art upon studying the above description, the following examples are set forth for illustrative purposes:

EXAMPLE 1

22 point top lined cylinder board was coated with a clay coating having 52% solids and 14% soy protein binder using a number 24 wire wound rod. The coating was aged overnight in a TAPPI constant humidity and temperature room. The coating was formulated as follows:

|  | Parts |
|---|---|
| $H_2O$ | 98.4 |
| Kaolin clay | 390.0 |
| 15% solution of Ralston Purina Co. low viscosity soy protein | 364.1 |
| Defoamer | 3.0 |
| Total | 855.5 |

The dried, aged coated board was calendered on a B. F. Perkins & Son, Inc. three roll laboratory calender using one steel roll and one cotton filled roll at 150 p.l.i. and at a web speed of 115 feet per minute. The coating side of the board was next to the steel roll. The coated board was progressively calendered at three temperatures, 150° F., 200° F., and 250° F. with two nips at each temperature. The results of the calendering are given in Table III.

EXAMPLE 2

22 point top lined cylinder board coated and prepared as described in Example 1 was subjected to a solvent treatment prior to calendering. The solvent system consisted of a solution of 50 parts acetone, 50 parts $H_2O$, and 0.5 part of alkyl ethoxylated phenol (AEP). The solvent system was sprayed on the coated board in two passes at a total application of eight grams per 51 square inches of board. The treated coated board was dried to a tack free surface, about five to ten minutes, and calendered as described in Example 1. The results of the calendering are given in Table III.

EXAMPLE 3

22 point top lined cylinder board was coated with a clay coating having 62.5% solids and 15.3% of a soy protein-SBR cobinder using a number 24 wire wound rod. The coating was aged overnight in a TAPPI constant humidity and temperature room. The coating was formulated as follows:

|  | Parts |
|---|---|
| $H_2O$ | 119.5 |
| Kaolin clay | 390.0 |
| 15% solution of Ralston Purina Co. low viscosity soy protein | 122.0 |
| 48% solids SBR latex emulsion | 86.1 |
| Defoamer | 3.0 |
| Total | 720.6 |

The dried, aged coated board was calendered as described in Example 1. The results of the calendering are given in Table III.

EXAMPLE 4

22 point top lined cylinder board coated and prepared as described in Example 3 was subjected to the solvent treatment described in Example 2. The treated board was calendered as described in Example 1. The results of the calendering are given in Table III.

EXAMPLE 5

22 point top lined cylinder board was coated with a clay coating having 62% solids and 14% SBR binder using a number 24 wire wound rod. The coating was aged overnight in a TAPPI constant humidity and temperature room. The coating was formulated as follows:

|  | Parts |
|---|---|
| $H_2O$ | 213.0 |
| Kaolin clay | 390.0 |
| 48% solids SBR latex emulsion | 114.0 |
| Defoamer | 3.0 |
| Total | 720.0 |

The dried, aged coated board was calendered as described in Example 1. The results of the calendering are given in Table III.

TABLE III

| Example | Treatment | Calender temperature | 75° Photovolt sheet gloss |
|---|---|---|---|
| 1 (soy binder) | Normal dry calendering | 150 | 54.0 |
| 1 | do | 200 | 62.0 |
| 1 | do | 250 | 67.7 |
| 2 (soy binder) | Solvent treatment | 150 | 58.4 |
| 2 | do | 200 | 74.0 |
| 2 | do | 250 | 80.7 |
| 3 (soy-SBR binder) | Normal dry calendering | 150 | 65.2 |
| 3 | do | 200 | 71.4 |
| 3 | do | 250 | 75.7 |
| 4 (soy-SBR binder) | Solvent treatment | 150 | 73.5 |
| 4 | do | 200 | 76.5 |
| 4 | do | 250 | 81.2 |
| 5 (SBR binder) | Normal dry calendering | 150 | 73.1 |
| 5 | do | 200 | 75.1 |
| 5 | do | 250 | 79.9 |

EXAMPLE 6

22 point top lined cylinder board was coated and prepared as described in Example 1 and was calendered at 250° F. through two nips.

EXAMPLE 7

22 point top lined cylinder board was coated and prepared as described in Example 3 and was calendered at 250° F. through two nips.

EXAMPLE 8

22 point top lined cylinder board was coated and prepared as described in Example 5 and was calendered at 250° F. through two nips.

EXAMPLE 9

22 point top lined cylinder board was coated and prepared as described in Example 1. The prepared coated board was subjected to a solvent treatment prior to calendering as described in Example 2. The solvent system consisted of a solution of 10.0 parts diethylene glycol, 90.0 parts methyl alcohol, and 0.5 part alkyl ethoxylated phenol (AEP). The treated board was calendered at 250° F. through two nips.

EXAMPLE 10

22 point top lined cylinder board was coated and prepared as described in Example 3. The prepared coated board was subjected to a solvent treatment prior to calendering as described in Example 9. The treated board was calendered at 250° F. through two nips.

TABLE IV

| Example | Treatment | Calender temperature, °F. | 75° photovolt sheet gloss |
|---|---|---|---|
| 6 (soy binder) | Normal dry calendering | 250 | 64.4 |
| 7 (soy-SBR binder) | do | 250 | 68.3 |
| 8 (SBR binder) | do | 250 | 74.7 |
| 9 (soy binder) | Solvent treatment | 250 | 75.5 |
| 10 (soy-SBR binder) | do | 250 | 74.0 |

EXAMPLE 11

22 point top lined cylinder board was coated with a clay coating having 45% solids and 14% casein binder using a number 24 wire wound rod. The coating was aged overnight in a TAPPI constant humidity and temperature room. The coating was formulated as follows:

| | Parts |
|---|---|
| $H_2O$ | 232.4 |
| Kaolin clay | 390.0 |
| 15% HCl precipitated New Zealand casein solution | 364.1 |
| Defoamer | 3.0 |
| Total | 989.5 |

The dried, aged coated board was calendered on a B. F. Perkins & Son, Inc. three roll laboratory calender using one steel roll and one cotton filled roll at 150 p.l.i. and at a board rate of 115 feet per minute. The coating side of the board was next to the steel roll. The coated board was progressively calendered at two temperatures, 150° F. and 290° F. with two nips at each temperature. The results of the calendering are given in Table V.

EXAMPLE 12

22 point top lined cylinder board coated and prepared as described in Example 11 was subjected to a solvent treatment prior to calendering. The solvent system consisted of a solution of 50 parts acetone, 50 parts $H_2O$ and 0.5 part of alkyl ethoxylated phenol (AEP). The solvent system was sprayed on the coated board in two passes at a total application of 8 grams per 51 square inches of board. The treated coated board was dried to a tack free surface, about five to ten minutes, and calendered as described in Example 11. The results of the calendering are given in Table V.

EXAMPLE 13

22 point top lined cylinder board was coated with a clay coating having 50% solids and 14% of a casein-SBR cobinder using a number 24 wire wound rod. The coating was aged overnight in a TAPPI constant humidity and temperature room. The coating was formulated as follows:

| | Parts |
|---|---|
| $H_2O$ | 258.1 |
| Kaolin clay | 390.0 |
| 15% HCl precipitated New Zealand casein solution | 182.0 |
| 48% solids SBR latex emulsion | 56.9 |
| Defoamer | 3.0 |
| Total | 890.0 |

The dried, aged coated board was calendered as described in Example 11. The results of the calendering are given in Table V.

EXAMPLE 14

22 point top line cylinder board coated and prepared as described in Example 13 was subjected to the solvent treatment described in Example 12. The treated board was calendered as described in Example 11. The results of the calendering are given in Table V.

EXAMPLE 15

22 point top lined cylinder board was coated and prepared as described in Example 5. The dried, aged coated board was calendered as described in Example 11. The results of the calendering are given in Table V.

TABLE V

| Example | Treatment | Calender temperature, °F. | 75° photovolt sheet gloss |
|---|---|---|---|
| 11 (casein binder) | Normal dry calendering | 150 | 38.8 |
| 11 | do | 290 | 60.0 |
| 12 (casein binder) | Solvent treatment | 150 | 51.5 |
| 12 | do | 290 | 70.3 |
| 13 (casein-SBR binder) | Normal dry calendering | 150 | 55.5 |
| 13 | do | 290 | 70.8 |
| 14 (casein-SBR binder) | Solvent treatment | 150 | 67.3 |
| 14 | do | 290 | 71.7 |
| 15 (SBR binder) | Normal dry calendering | 150 | 67.1 |
| 15 | do | 290 | [1] 78.4 |

[1] The coating picked from the board and stuck to the steel calender roll in this test.

EXAMPLE 16

22 point top lined cylinder board was coated with a clay coating having 52% solids and 14% soy protein binder using a number 24 wire wound rod. The coating was aged overnight in a TAPPI constant humidity and temperature room. The coating was formulated as follows:

| | Parts |
|---|---|
| $H_2O$ | 98.4 |
| Kaolin clay | 390.0 |
| 15% solution of Ralston Purina Co. soy protein | 364.1 |
| Defoamer | 3.0 |
| Total | 855.5 |

The dried, aged coated board was calendered on a B. F. Perkins & Son, Inc. three roll laboratory calender using one steel roll and one cotton filled roll at 150 p.l.i. and at a board rate of 115 feet per minute. The coating side of the board was next to the steel roll. The coated board was progressively calendered at three temperatures, 150° F., 200° F., and 250° F. with two nips at each temperature.

EXAMPLE 17

22 point top lined cylinder board was coated with a clay coating having 62% solids and 14% SBR binder using a number 24 wire wound rod. The coating was aged overnight in a TAPPI constant humidity and temperature room. The coating was formulated as follows:

| | Parts |
|---|---|
| $H_2O$ | 213.0 |
| Kaolin clay | 390.0 |
| 48% solids SBR latex emulsion | 114.0 |
| Defoamer | 3.0 |
| Total | 720.0 |

The dried, aged board was calendered as described in Example 16.

EXAMPLE 18

22 point top lined cylinder board was coated with a clay coating having 57% solids and 14% of a soy protein-SBR cobinder using a number 24 wire wound rod. The coating was aged overnight in a TAPPI constant humidity and temperature room. The coating was formulated as follows:

| | Parts |
|---|---|
| $H_2O$ | 148 |
| Kaolin clay | 390 |
| 15% solution of Ralston Purina Co. soy protein | 182 |
| 48% solids SBR latex binder | 57 |
| Defoamer | 3 |
| Total | 780 |

The dried, aged coated board was calendered as described in Example 16.

EXAMPLE 19

22 point top lined cylinder board was coated with a clay coating containing 57% solids and 14% of a soy protein-SBR cobinder using a number 24 wire wound rod. The coating contained 17.9% Ed T/20 (dry protein basis). The coating was aged overnight in a TAPPI constant humidity and temperature room. The coating was formulated as follows:

| | Parts |
|---|---|
| $H_2O$ | 148 |
| Kaolin clay | 390 |
| 15% Ed T/20-soy protein solution (17 parts Ed T/20 and 95 parts soy protein) | 182 |
| 48% solids SBR latex binder | 57 |
| Defoamer | 3 |
| Total | 780 |

The dried, aged board was calendered as described in Example 16.

EXAMPLE 20

A 57% solids, 14% cobinder coating containing 11.9% Ed T/20 (dry protein basis) was coated on 22 point top lined cylinder board by the method described in Example 4. The coating was formulated as follows:

| | Parts |
|---|---|
| $H_2O$ | 148 |
| Kaolin clay | 390 |
| 15% Ed T/20-soy protein solution (12.5 parts Ed T/20 to 105 parts soy protein) | 182 |
| 48% solids SBR latex binder | 57 |
| Defoamer | 3 |
| Total | 780 |

The dried, aged board was calendered by the method of Example 16.

EXAMPLE 21

A 57% solids, 14% cobinder coating containing 20.0% Ed T/20 (dry protein basis) was coated on 22 point top lined cylinder board by the method described in Example 4. The coating was formulated as follows:

| | Parts |
|---|---|
| $H_2O$ | 148 |
| Kaolin clay | 390 |
| 18% Ed T/20-soy protein solution (21 parts Ed T/20 to 105 parts soy protein) | 182 |
| 48% solids SBR latex binder | 57 |
| Defoamer | 3 |
| Total | 780 |

The dried, aged board was calendered by the method of Example 16.

Table VI summarizes the results of Examples 16 to 21.

TABLE VI

| Example | Binder | Calender temperature, °F. | 75° photovolt sheet gloss |
|---|---|---|---|
| 16 | Soy | 150 | 49.4 |
| 16 | Soy | 200 | 55.9 |
| 16 | Soy | 250 | 61.7 |
| 17 | SBR | 150 | 68.6 |
| 17 | SBR | 200 | 71.0 |
| 17 | SBR | 250 | 75.4 |
| 18 | Soy-SBR | 150 | 58.9 |
| 18 | Soy-SBR | 200 | 65.0 |
| 18 | Soy-SBR | 250 | 68.8 |
| 19 | Soy-SBR 17.9% Ed T/20 | 150 | 63.1 |
| 19 | Soy-SBR 17.9% Ed T/20 | 200 | 67.0 |
| 19 | Soy-SBR 17.9% Ed T/20 | 250 | 74.2 |
| 20 | Soy-SBR 11.9% Ed T/20 | 150 | 64.3 |
| 20 | Soy-SBR 11.9% Ed T/20 | 200 | 67.9 |
| 20 | Soy-SBR 11.9% Ed T/20 | 250 | 73.9 |
| 21 | Soy-SBR 20.0% Ed T/20 | 150 | 62.9 |
| 21 | Soy-SBR 20.0% Ed T/20 | 200 | 68.1 |
| 21 | Soy-SBR 20% Ed T/20 | 250 | 72.9 |

EXAMPLE 22

Coated 22 point top lined cylinder board was prepared and calendered as described in Example 16.

EXAMPLE 23

Coated 22 point top lined cylinder board was prepared and calendered as described in Example 17.

EXAMPLE 24

Coated 22 point top lined cylinder board was prepared and calendered as described in Example 18.

EXAMPLE 25

22 point top lined cylinder board was coated with a clay coating containing 57% solids and 14% of a soy protein-SBR cobinder using a number 24 wire wound rod. The coating contained 1.62% TMAH (dry protein basis). The coating was aged overnight in a TAPPI constant humidity and temperature room. The coating was formulated as follows:

| | Parts |
|---|---|
| $H_2O$ | 148 |
| Kaolin clay | 390 |
| 15% TMAH-soy protein solution (1.7 parts TMAH to 105 parts soy protein) | 182 |
| 48% solids SBR latex cobinder | 57 |
| Defoamer | 3 |
| Total | 780 |

The dried, aged board was calendered as described in Example 16.

EXAMPLE 26

A 57% solids, 14% cobinder coating containing 3.91% TMAH (dry protein basis) was coated on 22 point top lined cylinder board and calendered by the method of Example 25. The coating was formulated as follows:

| | Parts |
|---|---|
| $H_2O$ | 148 |
| Kaolin clay | 390 |
| 15% TMAH-soy protein solution (4.1 parts TMAH to 105 parts soy protein) | 182 |
| 48% solids SBR latex binder | 57 |
| Defoamer | 3 |
| Total | 780 |

EXAMPLE 27

A 57% solids, 14% cobinder coating containing 9.43% TMAH (dry protein basis) was coated on top lined 22 point cylinder board and calendered by the method of Example 25. The coating was formulated as follows:

| | Parts |
|---|---|
| $H_2O$ | 148 |
| Kaolin clay | 390 |
| 16.4% TMAH-soy protein solution (10 parts TMAH to 105 parts soy protein) | 182 |
| 48% SBR latex cobinder | 57 |
| Defoamer | 3 |
| Total | 780 |

EXAMPLE 28

A 57% solids, 14% cobinder coating containing 10.5% TMAH (dry protein basis) was coated on 22 point top lined cylinder board and calendered by the method of Example 25. The coating was formulated as follows:

|  | Parts |
|---|---|
| H₂O | 148 |
| Kaolin clay | 390 |
| 15% TMAH-soy protein solution (10 parts TMAH to 95 parts soy protein) | 182 |
| 48% SBR latex cobinder | 57 |
| Defoamer | 3 |
| Total | 780 |

Table VII summarizes the results of Examples 22 to 28.

TABLE VII

| Example | Binder | Calender temperature, °F. | 75° photovolt sheet gloss |
|---|---|---|---|
| 22 | Soy | 150 | 53.0 |
| 22 | Soy | 200 | 58.4 |
| 22 | Soy | 250 | 63.8 |
| 23 | SBR | 150 | 71.0 |
| 23 | SBR | 200 | 73.8 |
| 23 | SBR | 250 | 76.8 |
| 24 | Soy-SBR | 150 | 62.4 |
| 24 | Soy-SBR | 200 | 66.0 |
| 24 | Soy-SBR | 250 | 70.7 |
| 25 | Soy-SBR 1.62% TMAH | 150 | 64.7 |
| 25 | Soy-SBR 1.62% TMAH | 200 | 66.2 |
| 25 | Soy-SBR 1.62% TMAH | 250 | 73.7 |
| 26 | Soy-SBR 3.91% TMAH | 150 | 65.6 |
| 26 | Soy-SBR 3.91% TMAH | 200 | 67.7 |
| 26 | Soy-SBR 3.91% TMAH | 250 | 75.3 |
| 27 | Soy-SBR 9.43% TMAH | 150 | 65.8 |
| 27 | Soy-SBR 9.43% TMAH | 200 | 68.4 |
| 27 | Soy-SBR 9.43% TMAH | 250 | 74.8 |
| 28 | Soy-SBR 10.5% TMAH | 150 | 66.8 |
| 28 | Soy-SBR 10.5% TMAH | 200 | 68.5 |
| 28 | Soy-SBR 10.5% TMAH | 250 | 75.4 |

EXAMPLE 29

Coated 22 point top lined cylinder board was prepared and calendered as described in Example 16.

EXAMPLE 30

Coated 22 point top lined cylinder board was prepared and calendered as described in Example 17.

EXAMPLE 31

Coated 22 point top lined cylinder board was prepared and calendered as described in Example 18.

EXAMPLE 32

22 point top lined cylinder board was coated with a clay coating containing 57% solids and 14% of a soy protein-SBR cobinder using a number 24 wire wound rod. The coating contained 4.8% TEA (dry protein basis). The coating was aged overnight in a TAPPI constant humidity and temperature room. The coating was formulated as follows:

|  | Parts |
|---|---|
| H₂O | 148 |
| Kaolin clay | 390 |
| 15% TEA-soy protein solution (5 parts TEA to 100 parts soy protein) | 183 |
| 48% latex cobinder | 57 |
| Defoamer | 3 |
| Total | 780 |

The dried, aged board was calendered as described in Example 16.

EXAMPLE 33

A 57% solids, 14% cobinder coating containing 9.5% TEA (dry protein basis) was coated on 22 point top lined cylinder board and calendered by the method of Example 32. The coating was formulated as follows:

|  | Parts |
|---|---|
| H₂O | 148 |
| Kaolin clay | 390 |
| 15% TEA-soy protein solution (10 parts TEA to 95 parts soy protein) | 182 |
| 48% latex cobinder | 57 |
| Defoamer | 3 |
| Total | 780 |

EXAMPLE 34

A 57% solids, 14% cobinder coating containing 14.3% TEA (dry protein basis) was coated on 22 point top lined cylinder board and calendered by the method of Example 32. The coating was formulated as follows:

|  | Parts |
|---|---|
| H₂O | 148 |
| Kaolin clay | 390 |
| 15% TEA-soy protein solution (15 parts TEA to 90 parts soy protein) | 182 |
| 48% latex cobinder | 57 |
| Defoamer | 3 |
| Total | 780 |

Table VIII summarizes the results of Examples 29 to 34.

TABLE VIII

| Example | Binder | Calender temperature, °F. | 75° photovolt sheet gloss |
|---|---|---|---|
| 29 | Soy | 150 | 46.7 |
| 29 | Soy | 200 | 54.9 |
| 29 | Soy | 250 | 60.9 |
| 30 | SBR | 150 | 67.1 |
| 30 | SBR | 200 | 73.9 |
| 30 | SBR | 250 | 75.6 |
| 31 | Soy-SBR | 150 | 57.1 |
| 31 | Soy-SBR | 200 | 65.5 |
| 31 | Soy-SBR | 250 | 66.8 |
| 32 | Soy-SBR 4.8% TEA | 150 | 59.9 |
| 32 | Soy-SBR 4.8% TEA | 200 | 63.8 |
| 32 | Soy-SBR 4.8% TEA | 250 | 67.8 |
| 33 | Soy-SBR 9.5% TEA | 150 | 59.0 |
| 33 | Soy-SBR 9.5% TEA | 200 | 66.2 |
| 33 | Soy-SBR 9.5% TEA | 250 | 68.0 |
| 34 | Soy-SBR 14.3% TEA | 150 | 61.1 |
| 34 | Soy-SBR 14.3% TEA | 200 | 71.3 |
| 34 | Soy-SBR 14.3% TEA | 250 | 73.9 |

EXAMPLE 35

A coated paperboard was prepared and calendered as described in Example 1.

EXAMPLE 36

A coated paperboard was prepared and calendered as described in Example 5.

EXAMPLE 37

A coated paperboard was prepared and calendered as described in Example 3.

EXAMPLE 38

A coated paperboard was prepared as described in Example 1 using 2.1% TEA addition. The prepared paperboard was subjected to the solvent treatment and calendered as described in Example 2.

EXAMPLE 39

A coated paperboard was prepared as described in Example 32 using only 1.05% TEA. The prepared paperboard was subjected to the solvent treatment and calendered as described in Example 2.

Table IX summarizes the results of Examples 35 to 39.

TABLE IX

| Example | Treatment | Calender temperature, °F. | 75° photovolt sheet gloss |
|---|---|---|---|
| 35 (soy binder) | Normal dry calendering | 150 | 46.4 |
| Do | do | 200 | 54.3 |
| Do | do | 250 | 59.4 |
| 36 (SBR binder) | do | 150 | 64.8 |
| Do | do | 200 | 72.3 |
| Do | do | 250 | 74.0 |
| 37 (soy-SBR binder) | do | 150 | 55.9 |
| Do | do | 200 | 63.6 |
| Do | do | 250 | 67.0 |
| 38 (soy binder 2.1% TEA) | Solvent treatment | 150 | 62.1 |
| Do | do | 200 | 69.6 |
| Do | do | 250 | 71.8 |
| 39 (soy-SBR binder 1.05% TEA) | do | 150 | 69.4 |
| Do | do | 200 | 75.7 |
| Do | do | 250 | 77.0 |

It is apparent from the data of Tables I through IX that the method of this invention can achieve a substantial increase in the gloss properties of coated paperboard. In all examples the 75° gloss (as measured by a Photovolt Model 660-P glossmeter TAPPI method #T-480ts65) of protein containing coating compositions was raised by the solvent treatment prior to calendering by the addition of gloss forming materials to the paper coating composition and by the combination of both processes. The normal increase in the gloss was five to twenty points, a significant improvement in the gloss. By using the proper conditions the gloss of protein binder coated paperboard can be increased to a value comparable to that of coated paperboard containing a 100% SBR binder; in many cases the gloss of the protein bound board can be increased to a value greater than that of all SBR bound board. Gloss improvement of this order is wholly unprecedented in a coating process that does not resort to expensive and difficult glossing techniques.

The process of the invention also provides a significant improvement in the ink holdout characteristics of the finished, coated paperboard along with an improvement in gloss. For example, the specimens prepared in Examples 1 through 5 were tested for K and N ink holdout according to TAPPI method #RC-19. The results of the test are summarized in Table X. It is clear from the data presented in Table X that the decrease in coating brightness is less with coated board which has been subjected to the process of this invention.

TABLE X

| Example | Treatment | Calendar temperature, °F. | K and N ink receptivity, percent brightness decrease |
|---|---|---|---|
| 1 (soy binder) | Normal dry calendering | 150 | 62.6 |
| Do | do | 200 | 62.2 |
| Do | do | 250 | 58.8 |
| 2 (soy binder) | Solvent treatment | 150 | 55.6 |
| Do | do | 200 | 52.5 |
| Do | do | 250 | 54.7 |
| 3 (soy-SBR binder) | Normal dry calendering | 150 | 56.0 |
| Do | do | 200 | 52.4 |
| Do | do | 250 | 52.4 |
| 4 (soy-SBR binder) | Solvent treatment | 150 | 53.4 |
| Do | do | 200 | 45.0 |
| Do | do | 250 | 42.5 |
| 5 (SBR binder) | Normal dry calendering | 150 | 69.7 |
| Do | do | 200 | 65.9 |
| Do | do | 250 | 64.1 |

I claim:
1. A method of increasing the gloss of protein bound coated paperboard comprising:
   (a) preparing a protein bound pigmented coating composition containing a gloss inducing material selected from the group consisting of tetramethyl ammonium hydroxide, tetramethyl ammonium chloride and a N-alkyl-N-polyethoxy-N',N' - dipolyethoxy-1,3-propylene diamine, the gloss inducing material being present in proportions of between about 1½ to 20% of the protein binder;
   (b) subsequently coating a paperboard substrate with the treated coating composition; and
   (c) calendering the treated coated paperboard to a high gloss.
2. The method of claim 1 wherein the gloss inducing material is a N-alkyl-N-polyethoxy-N',N'-dipolyethoxy-1,3-propylene diamine.
3. The method of claim 1 wherein the coated paperboard is calendered at a temperature of between 150° F. and 300° F. to a gloss which is substantially higher than untreated, normally calendered coated paperboard.
4. A method of increasing the gloss of protein bound coated paperboard comprising:
   (a) preparing a protein bound pigmented coating composition containing a gloss inducing material selected from the group consisting of tetramethyl ammonium hydroxide, tetramethyl ammonium chloride and a N-alkyl-N-polyethoxy-N',N'-dipolyethoxy - 1,3-propylene diamine, the gloss inducing material being present in proportions of between about 1½ to 20% of the protein binder;
   (b) coating a paperboard substrate with the coating composition;
   (c) applying a gloss inducing solution to the coated paperboard; and
   (d) calendering the coated paperboard to a high gloss.
5. The method of claim 4 wherein the gloss inducing solution is selected from solutions of at least two of the group consisting of water, acetone, methanol and diethylene glycol.
6. The method of claim 4 wherein the coated paperboard is dried prior to application of the gloss inducing solution and the gloss inducing solution is added in quantities of about 6 pounds or less per 1,000 square feet of dried coated paperboard.
7. The method of claim 6 wherein the gloss inducing solution treated paperboard is dried to a tack free condition prior to calendering.
8. The method of claim 4 wherein the treated coated paperboard is calendered at a temperature of between 150° F. and 300° F.
9. The method of claim 4 wherein the solution contains an additional wetting agent.
10. The method of claim 4 wherein the solution contains an alkyl ethoxylated phenol as the wetting agent.

References Cited

UNITED STATES PATENTS

| | | | |
|---|---|---|---|
| 2,058,961 | 10/1936 | Dozier | 117—156 |
| 2,632,714 | 3/1953 | Loomer | 117—156 X |
| 3,338,736 | 8/1967 | Hain | 117—156 X |
| 2,611,717 | 9/1952 | Sooy et al. | 117—156 X |
| 2,790,730 | 4/1957 | Trosset | 117—156 X |
| 3,338,734 | 8/1967 | Goff et al. | 117—156 |
| Re. 25,039 | 9/1961 | Frost et al. | 117—156 X |
| 2,756,164 | 7/1956 | Fisher | 117—64 |
| 3,028,258 | 4/1962 | Rice | 117—156 X |
| 2,725,307 | 11/1955 | Sooy et al. | 117—83 |
| 2,698,259 | 12/1954 | Trosset et al. | 117—156 |
| 1,982,018 | 11/1934 | Owen | 117—156 |
| 2,691,606 | 10/1954 | Ziliox et al. | 117—156 X |

WILLIAM D. MARTIN, Primary Examiner

W. R. TRENOR, Assistant Examiner

U.S. Cl. X.R.

117—64, 83, 156, 164